Figure 3:
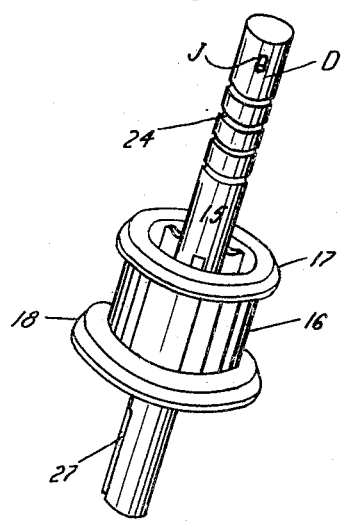

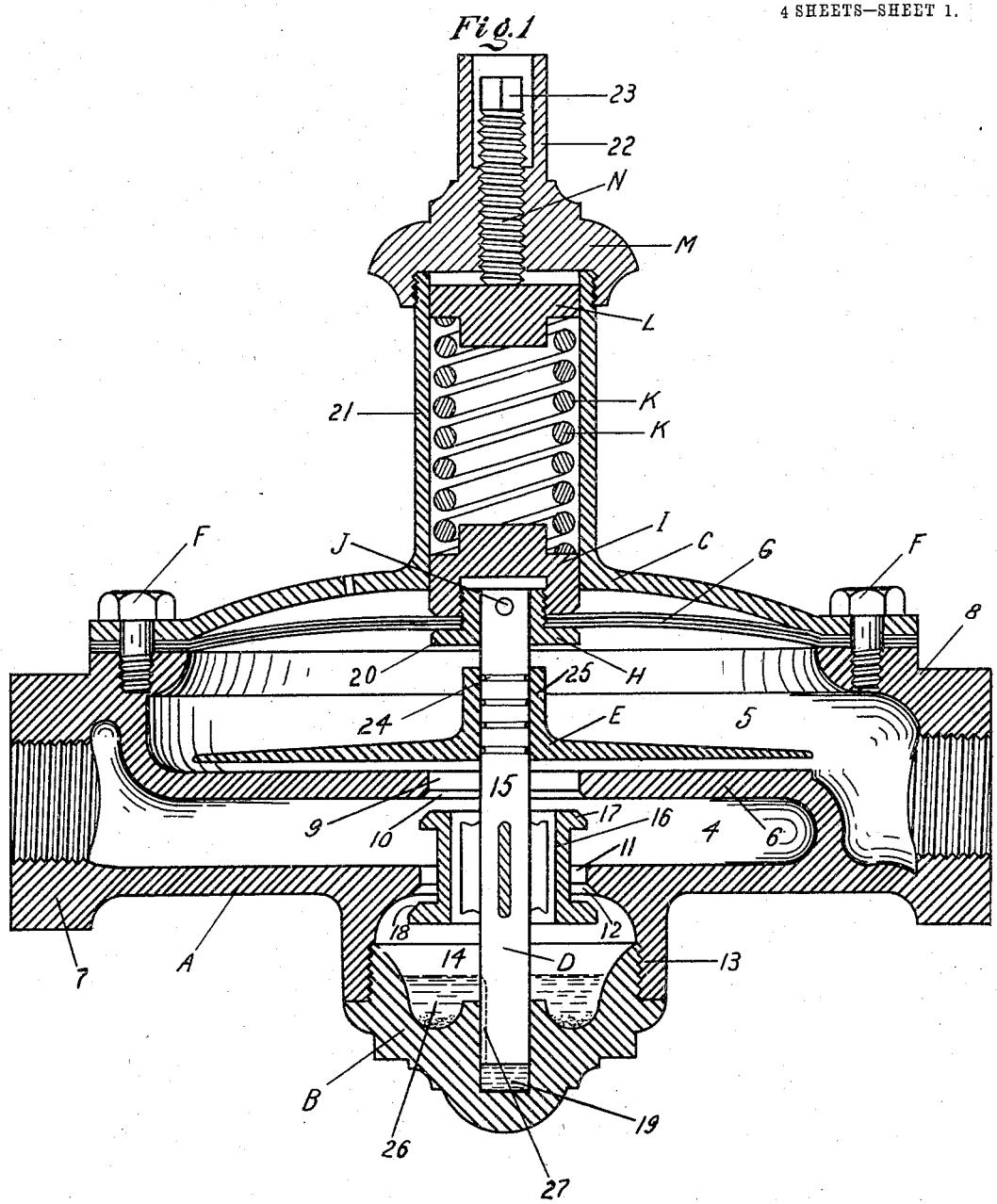

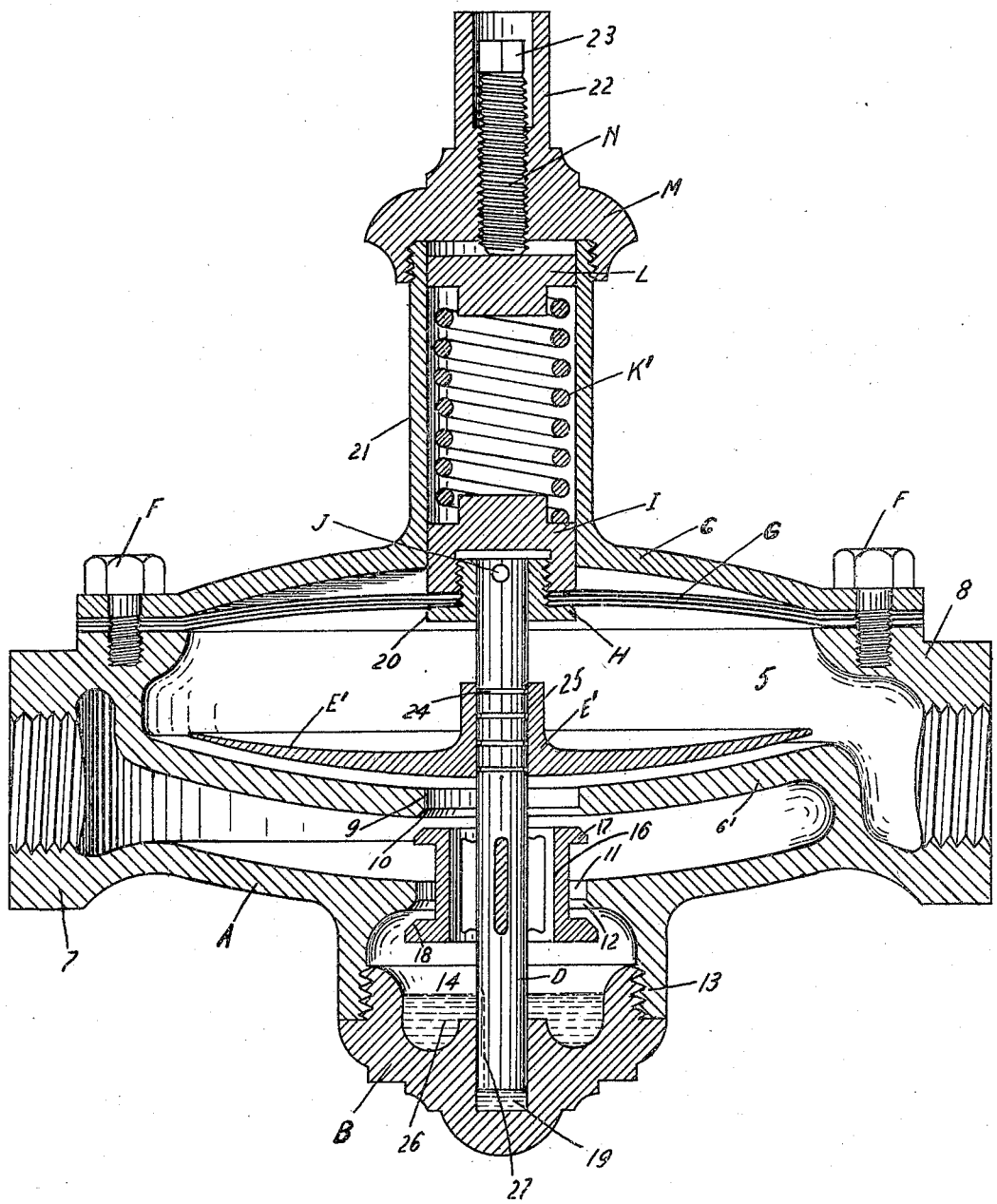

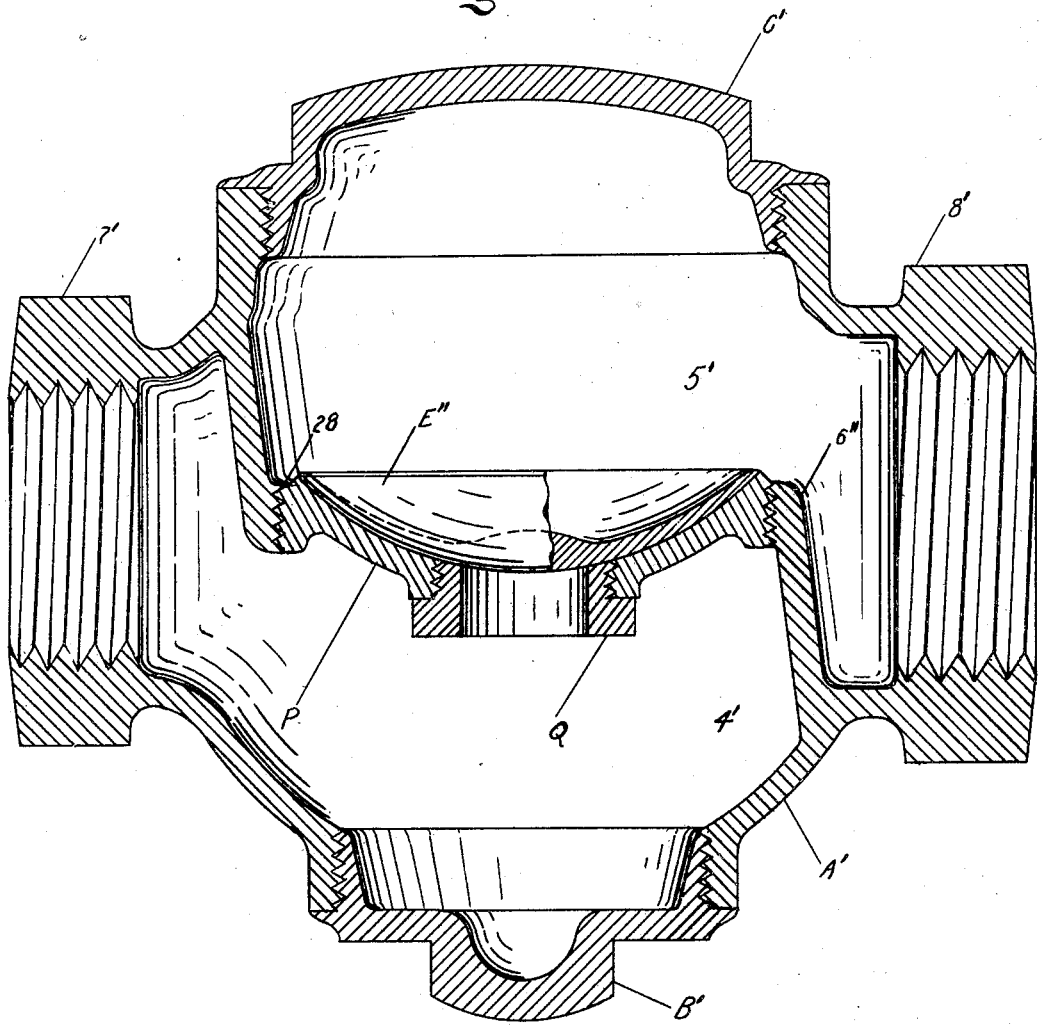

No. 792,757. Patented June 20, 1905.

UNITED STATES PATENT OFFICE.

JACOB CLOOS, OF MILWAUKEE, WISCONSIN, ASSIGNOR TO CLOOS ENGINEERING COMPANY, A CORPORATION OF WISCONSIN.

FLUID-PRESSURE REGULATOR.

SPECIFICATION forming part of Letters Patent No. 792,757, dated June 20, 1905.

Application filed August 12, 1904. Serial No. 220,502.

*To all whom it may concern:*

Be it known that I, JACOB CLOOS, a citizen of the United States, residing in the city of Milwaukee, county of Milwaukee, and State of Wisconsin, have invented a Fluid-Pressure Regulator; and I hereby declare that the following is a full, clear, and concise description of the invention, such as will enable persons skilled in the art to which it appertains to make and use the same.

The main objects of my invention are three—to wit, to maintain the secondary or lower pressure automatically constant and independent of wide variations in the primary pressure, to avoid erosion of the steam-passages, which takes place in regulators at present in use and which causes a rapid wear of the apparatus, besides diminishing the efficiency, and to prevent a vibratory movement of the valve, which is also of common occurrence and which not only occasions rapid fluctuation in the secondary pressure, but necessarily results in a very short life for the pressure-diaphragm.

One of the secondary results of my invention is the production of a regulator which is practically frictionless in adjustment and perfectly balanced and at the same time one with a minimum number of parts and weight and at a minimum expense.

It is well known that pressure-regulators as now manufactured depend for producing their effect entirely upon a throttling action upon the steam caused by the partial closure of an orifice by a plug or valve which is operated by a diaphragm exposed on one side to the secondary pressure. In order to reduce a pressure such as that ordinarily carried by steam-boilers to a pressure for house-heating systems, as from one-hundred-and-twenty-five-pounds gage to five-pounds gage, the throttling action of the valve must be very great, or, in other words, the area of the passage-way for the steam must be exceedingly small, which causes the steam to assume a very high velocity through this narrow passage-way. The natural result is that erosion necessarily takes place, cutting grooves in the valve-seat, so that the regulation of pressure becomes very imperfect and necessitates constant regrinding of the valve-seat and valve. In my regulator I have utilized a different principle, and throttling action is not depended upon in my construction to produce the main reduction in pressure; nor, on the other hand, is it possible for the steam to rise at any point to so high a velocity as to cause erosion. Briefly, I utilize the principle of free adiabatic expansion in a passage-way of increasing sectional area, and this passage-way, moreover, is caused by the principle of construction to so regulate itself in size as to maintain a substantially constant secondary pressure for a considerable range of primary pressures.

My construction may best be understood from the accompanying drawings and the following description relating thereto.

Figure 2:
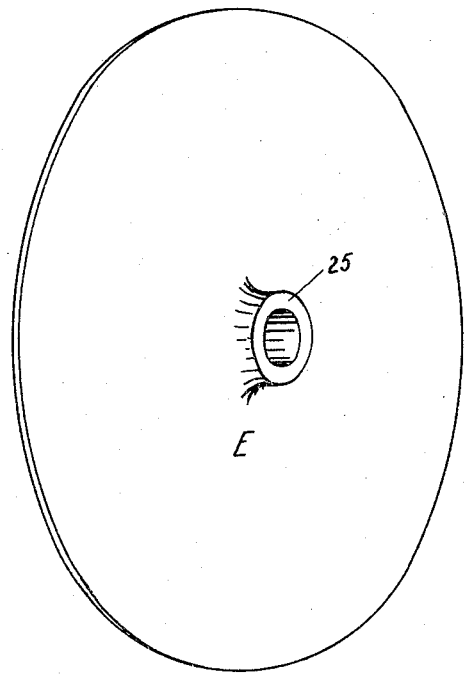
Figure 6:
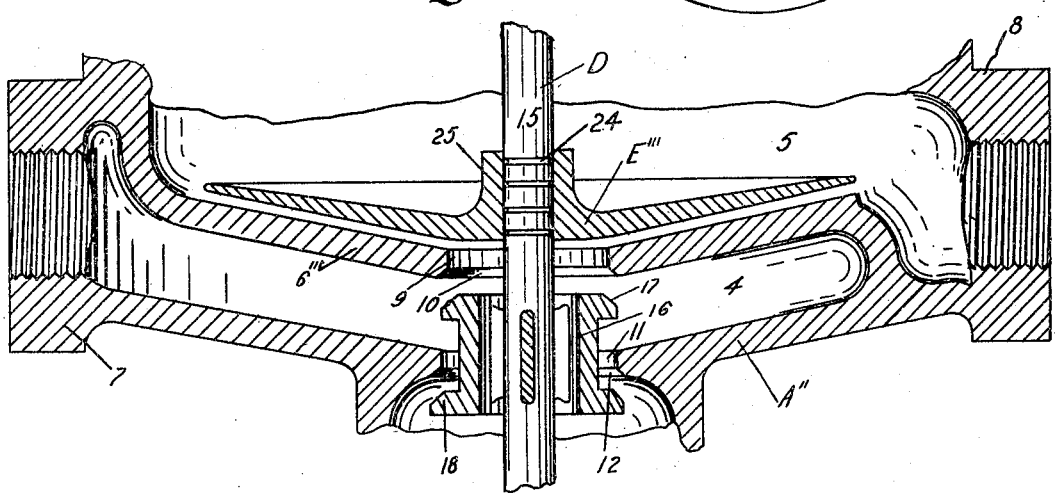

In the drawings, Figures 1 and 4 illustrate the preferred forms in axial cross-section. Fig. 2 is a perspective view of the reducing-disk, and Fig. 3 is a similar view of the valve in these forms. Figs. 5 and 6 are sectional views similar to Fig. 1, showing other embodiments of the invention.

The principle of my invention may be embodied in many forms; but, as shown in Fig. 1, the regulator consists of twenty-two parts—to wit, a body-casting A, an end piece B, a cover-piece C, a valve D, a reducing-disk E, six bolts F, a three-ply diaphragm G, a screw-piece H and lock-nut I, securing the diaphragm between them, a pin J, securing the screw-piece H to the valve-stem, two coiled compression-springs K, an abutment-piece L for the springs, a screw-cap M, and an adjusting-screw N.

The body-piece A has formed in it two chambers 4 and 5, separated by a horizontal partition 6. Also one of these chambers 4 is provided with a screw-boss 7, connecting with a source of high pressure, and the other chamber 5 with a screw-boss 8, connecting with the pipe delivering the secondary or lower pressure. In the center of the partition 6 is an orifice 9, having a conical valve-seat 10, and coaxial with this orifice is another orifice 11 in the lower wall of the casting A, this being also provided with a conical valve-seat 12. The casting A has an annular internally-threaded boss 13, which engages with the threaded end piece B, the two inclosing a chamber 14 below the chamber 4 and separated therefrom by the valve-seat 12.

The cover-piece C is secured to the body-piece A by the bolts F, and between it and the body-piece are secured the edges of the diaphragm G.

The valve D comprises the vertical cylindrical stem 15 and the valve-piece proper, 16, which is cast therewith, and is in the form of a barrel having conical seats 17 and 18, cooperating with the seats 10 and 12 on the casting A, so as to close the orifices 9 and 11. The lower end of the stem D reciprocates in a hydraulic dash-pot 19, formed in the end piece B, and its upper end is attached, by means of the pin J, to the screw-piece H, as aforesaid. Between the shoulder 20 of the screw-piece H and the nut I is clamped the diaphragm G. The nut I is cylindrical and reciprocates in a cylindrical barrel 21, which rises from the center of the cover-piece C and acts as a guide for the nut I, and through it the upper end of the stem 15. In the upper end of the barrel 21 is mounted the sliding abutment L, and the springs K are compressed between the nut I and the abutment. Over the end of the barrel 21 is screwed the cap M, as shown, and this cap is bored and threaded axially to receive the adjusting-screw N and is provided with the annular extension 22 to receive and protect the head of the adjusting-screw N. The adjusting-screw may be provided with a polygonal head 23 for the application of a key or socket wrench, so that the tension of the springs K may be adjusted.

On the upper end of the stem 15, over the partition 6 and in the chamber 5, is mounted the most important and essential element of my invention, consisting of the circular disk E. This disk is shown in perspective in Fig. 2. It is mounted loosely on the stem 15, so as to slide freely thereon, but yet prevent any appreciable escape of steam through the joint, and water-rings 24 should be cut in the stem to facilitate this end. This disk is provided at the center, as shown, with a boss or extension 25, so as to form a long bearing on the stem 15, which prevents it from binding thereon. The action of this disk is, by itself and independently of the valve D, to reduce the pressure of the steam in a predetermined ratio, depending on the size of the disk with relation to the size of the aperture 9. The disk E coöperates with the plane upper surface of the partititon 6 to produce a free adiabatic expansion of the steam, as will now be explained. The action of the disk E is a peculiar one and would be such as to regulate the pressure fairly well even were the valve D removed. It has been found, experimentally, that the ratio of pressure reduction will be approximately the same as that of the area of the disk E to that of the orifice 9. For example, if it be desired to reduce, say, one-hundred-and-twenty-five-pounds gage to five-pounds gage, the area of the disk E is to the orifice 9 as one hundred and forty to twenty, (the absolute pressure being taken for this ratio,) or, in other words, the diameter of the disk is approximately $\sqrt{7}$ times that of the orifice. It should be observed that the total pressure below the disk E (supposing the valve D to be open) is equal to the primary pressure multiplied by the area of the orifice, while that on its upper side equals that of the secondary pressure multiplied by the area of the disk. The pressure on the under side of the disk between the outer margin thereof and the outer margin of the orifice 9 will be, generally speaking, very low and considerably less than either the primary or secondary pressure, because the steam in this space acquires a velocity which results in a corresponding temporary loss of head to a point below that of the secondary pressure to which the steam rises again on arriving in the chamber 5. The velocity in this confined space is prevented from increasing unduly by reason of the area of the passage, which increases in proportion to the distance from the center of the disk, thus providing for its enlargement of volume. It will be found that any increase in the primary pressure is met automatically by the approach of the disk toward the partition-wall 6, narrowing the orifice correspondingly, so as to limit the fluctuation of pressure in the secondary in strict proportion to that in the primary. It will be observed, however, that the expansion taking place is a free adiabatic one over a long, expanding, and automatically-adjusted passage-way and that the velocity of the steam is limited to one at which no erosion or grooving can take place. It is also possible to regulate the effect produced by this disk by the weight given to it, added weight acting, naturally, to reduce the normal size of the opening; but this is not taken into account in the above explanation. In order to cause absolute constancy of the secondary pressure independently of fluctuations in the primary, I have added my novel balanced valve D. It will be seen that the fluid in the chamber 4 reaches the orifice 9 by two passages—to wit, first, through the passage between the parts 10 and 17, and, secondly, downwardly through the orifice 11 between parts 12 and 18 into the chamber 14 and upwardly through the interior of the barrel 16. This valve is perfectly balanced because the lower shoulder of the part 17 and the upper shoulder of the part 18, which are subjected to the primary pressure, are equal in area. The valve is actuated by the secondary pressure acting on the diaphragm G on the one hand and by the spring or springs K on the other, and the screw N is so adjusted that these opposed pressures are in equilibrium when the secondary pressure is correct. Thus any rise in the secondary pressure tends to close the valve D, and thus cut off the primary pressure and conversely. The chamber 14 also serves an important function—viz., to act as a dirt-receptacle for any solid particles or moisture entrained in the steam. These solid particles and moisture will ordinarily pass through the lowermost valve-passage into the chamber 14, whence they will be thrown by centrifugal force into the water of condensation 26 and accumulate in the annular cup-shaped bottom of the piece B. The water of condensation also fills the dash-pot 19 either through a longitudinal groove 27 in the stem or through the annular space between the stem and dash-pot, and this prevents any violent movements or vibration of the valve.

In Fig. 4 is shown a modified form of regulator having a convex reducing-disk E'—that is to say, one whose surface constitutes a spherical segment. The spherical form of disk possesses the advantage that the area of the steam-passage under the disk increases in less rapid proportion than in the case of the flat disk—that is to say, in less proportion than the distance from the axis—which tends to equalize the pressure under the disk. In this figure the partition 6' is concave to coöperate with the convex disk E', and the two springs K are replaced by a single spring K'.

Fig. 5 illustrates a further modification of the spherical disk-regulator wherein the throttling-valve D and its stem are omitted altogether in order to better illustrate the independent use of the reducing-disk principle. The pressure-regulator shown in Fig. 5 comprises in addition to the disk E" the body-piece A', the end or bottom cap-piece B', the cover-plate C', a seating-piece P, and a bushing Q. The body-piece has the attachment-bosses 7' and 8' at its opposite ends communicating, respectively, with the primary pressure-chamber 4' and the secondary pressure-chamber 5', between which extends the diagonal partition 6", which is horizontal at the center and has a circular threaded opening 28, with which engages the threaded margin of the seating-piece P. This piece is concavely cast and subsequently ground to accurately fit the spherical reducing-disk E' before screwed into place and has a central threaded opening into which is screwed the bushing Q, whose central opening corresponds to the pressure-reduction ratio, so that the same regulator may be used for different reduction ratios by simply changing the bushing Q. It will be observed that the spherical surface of the reducing-disk causes it to be equally well seated at whatever angle of inclination it may rest, and it cannot therefore lose its place on the seat. This form of regulator is found to operate well so long as the steam or gas is being withdrawn from the secondary side; but the moment the flow stops the pressure rises and the regulator ceases to operate. Hence it is necessary to instal a relief or safety valve on the secondary side to prevent any undue pressure-rise.

In Fig. 6 I have shown a fragmentary view of part of a regulator embodying a conical reducing-disk E''' and disk-seat 6''', this being merely shown to illustrate one of the forms which the reducing-disk may assume. The remainder of the regulator may be either similar to or different from either of the forms of Figs. 1 and 5.

Instead of the springs K or K', I may in some cases employ weights or the like, as usual in similar constructions.

It is to be observed that my pressure-regulator embodies the two distinct mechanisms constituted by the disk E and the valve D, either of which would within certain limitations operate of itself, were the other taken away, to reduce the pressure to the proper amount and keep it fairly constant at that amount; but the use of the two together results in a division of labor or function, such that the function of the disk E is to produce a general reduction in a given ratio between the two pressures and that of the valve D is to provide for minor fluctuations or variations in the primary pressure, or, in other words, to keep the fluid in the orifice 9 at a constant pressure independently of such variations. It is to be observed also that as the bulk of the labor of reduction is taken from the valve D no great degree of throttling is necessary, and therefore no excessive velocity can take place in the valveway, while again the pressure is very sensitive to slight changes in position of the valve D. Owing, moreover, to the fact that the general pressure reduction is wholly independent of the valve, vibrations of the diaphragm G, such as take place in most ordinary regulators and cause the rapid destruction of the diaphragm, are impossible in my pressure-regulator. I do not limit myself, therefore, to the specific forms shown or any of them, but reserve the right to any modifications embodying these principles so far as they lie within the scope of the claims.

Having thus described my invention, what I claim as new, and desire to secure by Letters Patent, is—

1. A pressure-reducing mechanism comprising parts arranged so as to form a self-adjusting expansion passage-way connecting the sources of primary and secondary pressure and a throttling mechanism acting at the opening of said passage-way and acted on by variation in the secondary pressure.

2. A pressure-regulator comprising a higher and a lower pressure chamber, a partition-wall separating them and having an orifice therein, and a floating member substantially covering said orifice and a portion of the surface on all sides of said orifice, in combination with throttling means governing said orifice and actuated by variations in the lower pressure.

3. A pressure-regulator comprising a higher and a lower pressure chamber, a partition-wall separating said chambers and having an orifice therein, and a reducing-disk having its adjacent surface parallel to and coöperating with that of the wall and overlying said orifice whereby to form a passage-way for free adiabatic expansion of the steam.

4. A pressure-regulator comprising a higher and a lower pressure chamber, a partition-wall separating said chambers and having an orifice therein, and a reducing-disk having its adjacent surface parallel to and coöperating with that of the wall and overlying said orifice whereby to form a passage-way for the free adiabatic expansion of the steam, in combination with a throttling-valve governing said orifice, and means acting upon said throttling-valve to actuate it in accordance with variations of the secondary pressure.

5. A pressure-regulator comprising a higher and a lower pressure chamber, a partition-wall separating said chambers and having an orifice therein and a concaved spherical seat in said partition-wall coaxial with said orifice, and a reducing-disk having a spherical surface resting upon said seat.

6. A pressure-regulator mechanism comprising a high and a low pressure chamber, a partition-wall separating said chambers and having an orifice therein, a parallel coaxial orifice in the opposite wall of said high-pressure chamber, an intermediate chamber adjacent to said high-pressure chamber and opposite said low-pressure chamber, valve-seats formed on the margin of both said orifices, and a balanced barrel-shaped valve coöperating with both said valve-seats and adapted to close both said orifices and actuated by variations in the secondary pressure.

7. A pressure-regulator comprising a body-piece having a high-pressure chamber, the latter having two parallel walls, a low-pressure chamber on one side thereof, and an intermediate chamber on the other side, a pair of coaxial orifices in the two walls connecting the high-pressure chamber respectively with the low-pressure and intermediate chambers, a barrel-shaped balanced valve acting simultaneously to close both said orifices, and means for governing the position of said valve in accordance with the pressure in said low-pressure chamber.

8. A pressure-regulator comprising a body-piece having a high-pressure chamber, the latter having two parallel walls, a low-pressure chamber on one side thereof, and an intermediate chamber on the other side, a pair of coaxial orifices in the two walls connecting the high-pressure chamber respectively with the low-pressure and intermediate chamber, a barrel-shaped balanced valve acting simultaneously to close both said orifices, and means for governing the position of said valve in accordance with the pressure in said low-pressure chamber, in combination with a floating reducing-disk covering the orifice leading to the secondary chamber and forming an elongated passage-way for the free adiabatic expansion of the steam.

9. A pressure-reducing mechanism comprising a high-pressure chamber, a low-pressure chamber, a horizontal partition separating said chambers and having a central orifice therein, an intermediate chamber below and centrally of said high-pressure chamber, the wall of the latter having also an orifice leading to said intermediate chamber and coaxial with said first-named orifice, a perfectly-balanced barrel-shaped valve adapted to simultaneously close both said orifices and having a hollow interior whereby fluid in the intermediate chamber passes freely to said first-named orifice, said valve having a stem passing upward into said low-pressure chamber, a diaphragm closing one side of said secondary chamber and subject to the pressure therein and connected to said stem, and means for resiliently actuating said diaphragm against said secondary pressure.

10. A pressure-reducing mechanism comprising a high-pressure chamber, a low-pressure chamber, a horizontal partition separating said chambers and having a central orifice therein, an intermediate chamber below and centrally of said high-pressure chamber, the wall of the latter having also an orifice leading to said intermediate chamber and coaxial with said first-named orifice, a balanced barrel-shaped valve adapted to simultaneously close both said orifices and having a hollow interior whereby fluid in the intermediate chamber passes freely to said first-named orifice, said valve having a vertical stem passing upward into said low-pressure chamber, a diaphragm closing one side of said secondary chamber and subject to the pressure therein and connected to said valve-stem, and means for resiliently actuating said diaphragm against said secondary pressure, in combination with a reducing-disk mounted loosely on said valve-stem and covering said first-named orifice and coöperating with the adjacent upper surface of the partition-wall to form an elongated passage-way for free adiabatic expansion of the steam.

11. In a pressure-regulating mechanism, in combination, a valve-stem, a barrel-shaped valve mounted on said stem and having a hollow interior, a high-pressure chamber, a condensation-chamber below said high-pressure chamber, an orifice connecting said chambers and governed by said valve, a low-pressure chamber above said high-pressure chamber and connected with the latter by an orifice also governed by said valve, and an end piece inclosing said condensation-chamber and having a cup-shaped interior adapted to receive dirt and water of condensation and having also a guiding-recess for the lower end of said valve-stem and which also acts as a dash-pot.

12. In a valve mechanism, in combination with a vertically-moving valve-stem, a chamber containing the lower end thereof, a cup forming the lower end of said chamber and adapted to receive water of condensation and having a central hydraulic dash-pot 19 adapted to receive and guide the lower end of said stem, the cup having further an annular groove forming a dirt-receptacle surrounding said dash-pot and separated therefrom; said chamber having entrance and exit passages substantially over said cup.

In testimony whereof I affix my signature in presence of two witnesses.

JACOB CLOOS.

Witnesses:
S. W. DALBERG,
GEORGE W. COLLES.